(12) United States Patent
Treloar

(10) Patent No.: US 7,950,665 B2
(45) Date of Patent: May 31, 2011

(54) EDUCATIONAL CARD GAME FOR ENHANCING COUNTING SKILLS

(76) Inventor: Blanche Treloar, East Hanover, NJ (US)

( * ) Notice: Subject to any disclaimer, the term of this patent is extended or adjusted under 35 U.S.C. 154(b) by 909 days.

(21) Appl. No.: 11/897,878

(22) Filed: Aug. 31, 2007

(65) Prior Publication Data

US 2009/0061397 A1    Mar. 5, 2009

(51) Int. Cl.
*A63F 1/00*     (2006.01)

(52) U.S. Cl. ........ 273/304; 273/308; 273/303; 273/292; D21/376

(58) Field of Classification Search .................. 273/292, 273/274, 309, 303–308; D21/376
See application file for complete search history.

(56) References Cited

U.S. PATENT DOCUMENTS

| | | | |
|---|---|---|---|
| 1,007,460 A * | 10/1911 | Legh | 273/305 |
| 3,618,952 A | 11/1971 | Tallarida | |
| 4,379,700 A | 4/1983 | Pollack | |
| 4,428,582 A | 1/1984 | Smith | |
| 4,561,658 A | 12/1985 | Peterson | |
| 4,854,586 A * | 8/1989 | Morse | 273/249 |
| 5,176,381 A | 1/1993 | Winters | |
| 5,441,278 A | 8/1995 | Nalder | |
| 5,445,390 A | 8/1995 | Dutton et al. | |
| 6,065,970 A | 5/2000 | Elliot | |
| 6,341,779 B1 | 1/2002 | Merritt | |
| 6,609,712 B1 | 8/2003 | Baumgartner | |
| 6,811,402 B1 | 11/2004 | Ritchie | |
| 6,948,938 B1 * | 9/2005 | Tseng | 434/129 |
| 2003/0034610 A1 * | 2/2003 | VanderKley et al. | 273/292 |
| 2004/0232618 A1 | 11/2004 | Frieman | |
| 2006/0214375 A1 * | 9/2006 | Wonpu | 273/292 |

\* cited by examiner

*Primary Examiner* — Benjamin H Layno
(74) *Attorney, Agent, or Firm* — Gearhart Law

(57) ABSTRACT

A method for playing a game, involving the steps of determining a combination number; dealing to at least one player at least three cards from a deck to make a hand, the deck having at least one group of cards sequentially numbered from one to thirteen; and providing a reward to the player for each combination the player makes of the cards equaling the combination number. A typical combination number is 10, or multiples of 10.

18 Claims, 2 Drawing Sheets

EDUCATIONAL CARD GAME FOR ENHANCING COUNTING SKILLS

FIELD OF THE INVENTION

The invention relates to card games, and in particular, games that are fun but also help the players perfect their addition, subtraction and multiplication skills.

BACKGROUND OF THE INVENTION

It is important for children to learn and acquire various basic skills during early education since these basic skills are relied upon to further advance the child's intellectual capabilities. For example, it is extremely important that children acquire basic math skills. Specifically, basic mathematical skills serve multiple purposes, including preparation for work, for citizenship, for general education, and for higher education.

Traditionally, math skills such as addition, subtraction, and multiplication have been taught through the use of flash cards. While the use of flash cards has created some successes, some children simply do not learn well from flash cards because flash cards rely on memorization rather than an understanding of underlying concepts. Therefore, it is desirable to have a fun and entertaining game, which is enjoyable for the players, but also helps children learn and visualize the math concepts so important for success in life.

There are several educational card games taught in the prior art, but none teach the method used in the present invention.

For example, U.S. Pat. No. 3,618,952 shows a game apparatus having at least one playing board having an array of uniquely identifiable positions thereon with such positions having numerical values that are associated therewith each position being identified by a playing card suit symbol and a numeral.

U.S. Pat. No. 4,379,700 teaches a multiplication-division game containing chips representing multiplication products and playing cards representing multiplier-multiplicand combinations which equal the products of said chips.

U.S. Pat. No. 4,428,582 teaches an apparatus for the playing of a variety of educational games by players of all ages and skills. Cards or tiles are provided with numbers on one side and letters on the other.

U.S. Pat. No. 4,561,658 teaches a matching game and game board for teaching math fundamentals such as multiplication, addition, subtraction, etc. to children. Cards having math problems thereon are distributed about the game board, and during the game individual players, via tokens, advance over the cards and around the game board.

U.S. Pat. No. 5,176,381 teaches a method of playing a game where there is a first set of dice, each of which has the numerical values of one through six thereon, and a second set of dice each of which has plus, minus, division and multiplication thereon. The two sets of dice are discharged onto a playing surface in a random pattern, and then the individual dice members of the first and second set are placed in an alternating pattern so that when the mathematical operations are performed as indicated in the overturning mating arrangement of the two sets of die, a desired maximum value is obtained.

U.S. Pat. No. 5,441,278 teaches an educational game for teaching the fundamentals of dimensional analysis, including a chip imprinted with an equal sign, and at least one set of cards. Each set of cards includes at least three cards, each card having first and second faces, each one imprinted with a line bisecting the face to form top and bottom generally rectangular halves. On each card a first symbol is imprinted on the top half of the first face and the same symbol is imprinted on the bottom half of the second face, while a different symbol is imprinted on the bottom half of the first face and that symbol is also a printed on the top half of the second face.

U.S. Pat. No. 5,445,390 teaches a mathematical board game for a plurality of players having a rectangular game board with a plurality of cards stations or chambers arranged in a matrix of horizontal and vertical rows. The card chambers include a start card chamber in each corner of the board and a plurality of problem card chambers in a perimeter of the board between the start card chambers. A plurality of answer card chambers on the board is surrounded by the start card chambers and the problem card chambers.

U.S. Pat. No. 6,065,970 shows a method of playing a game which includes (i) the game board which is divided into a plurality of sections, such that each of the section defines a playing location, (ii) a number disposed on each of the playing card locations, (iii) a plurality of cards, and (iv) a number disposed on each of the cards. The game includes the steps of (a) providing a game board with a multiplicity of the cards, (b) the game play or determining if the number indicated on any one of the cards is a first mathematical multiple of the number indicated on any one of the playing card locations, (c) removing from the multiplicity of the cards a first card that has the number indicated thereon, which is the first mathematical multiple of the card indicated on one of the playing locations, and (d) positioning the first card on one of the playing locations such that the number indicated on the first card is the first mathematical multiple of the number indicated on the playing location on which the first card is positioned.

U.S. Pat. No. 6,341,779 teaches a mathematical card and dice game comprising a deck of cards, a set of three dice, and a timing device, the deck of cards divided into four suits and 15 cards each, 10 of which are numbered one through 10, the remaining five nonnumeric cards having letters which can take on any value defined by the players prior to the game. A predetermined number of cards are dealt to players who use the value of the three dice rolled, common mathematical operations such as addition, subtraction, multiplication and division, and their knowledge of math to make mathematical relationships that equate to the value of the cards in their hands with predetermined amount of time stretched by a timing device. A successful match occurs when the card value equals the numeric result of a mathematical operation involving all three dice. Players play successful matching cards face down till the end of the round, when the time limit is up, whereon they turn the cards over and must be able to successfully explain the relationship the card value has to the dice values.

U.S. Pat. No. 6,609,712 relates to a math manipulative educational learning game in which a plurality of rods are provided for use in various manipulative games designed to teach rudimentary arithmetic skills. In the preferred embodiment, the rods are of various lengths and\or volumes, with the shortest length comprising a unit length, and other rods being formed as integral multiples of the unit length. Various games are disclosed in which a child is encouraged to manipulate the rods in various ways and in order to learn various arithmetic lessons.

U.S. Pat. No. 6,811,402 teaches a method of playing a mathematical game to calculate a target value which includes generating a target value randomly, generating a plurality of calculating numbers to be used to calculate the target value, and calculating, by a first player, an initial solution that is equal to the target value, by combining the calculating numbers with any combination of a plurality of mathematical operations in any order.

U.S. publication number US 2004/0232618 discloses decks of addition, subtraction, multiplication, division, and number recognition playing cards covering all the numbers generally employed in teaching children basic addition, subtraction, multiplication, division, and number recognition skills and are suitable for use in playing a variety of well-known card games such as War, Concentration, Old Maid, Go Fish, Rummy, Gin Rummy, 21, and Split.

None of the prior art described above, teaches the present invention.

SUMMARY OF THE INVENTION

A method for playing a game, involving the steps of determining a combination number; dealing to at least one player at least three cards from a deck to make a hand, the deck having at least one group of cards sequentially numbered from one to thirteen; and providing a reward to the player for each combination the player makes of the cards equaling the combination number. A typical combination number is 10, or multiples of 10.

The game of the present invention can be played for fun and entertainment, but will also help younger players learn and apply fundamental math concepts. The younger player will learn number concepts, number values for instant recognition, counting by tens, multiples of tens, and place values through the hundreds place. They will also learn addition and subtraction of values and recognition of coins in their values for example, penny, nickel, dime and quarters. The player will also learn calculating coin values through to a dollar, and counting change. Therefore, the player will have fun and learn important math concepts at the same time.

It is an object of the invention to provide for a fun and educational card game.

It is further an object of the invention to teach a player fundamental counting skills.

It is an object of the invention to teach number concepts by developing visualization techniques.

It is an object of the invention to teach the processes of addition and subtraction and their relationship to each other.

It is an object of the invention to illustrate the base ten system of numeration.

It is also an object of the invention to teach multiplication skills.

It is yet another object of the invention to provide a card game that can be played by players of all ages.

It is another object of the invention to teach a card game that can be played differently based on the age and skill development of the players.

It is also an object of the invention to teach a card game that can be played with an instructor.

It is an object of the invention to teach a card game that provides rewards when the player makes correct combinations.

DESCRIPTION OF THE PREFERRED EMBODIMENTS

Figure 1:
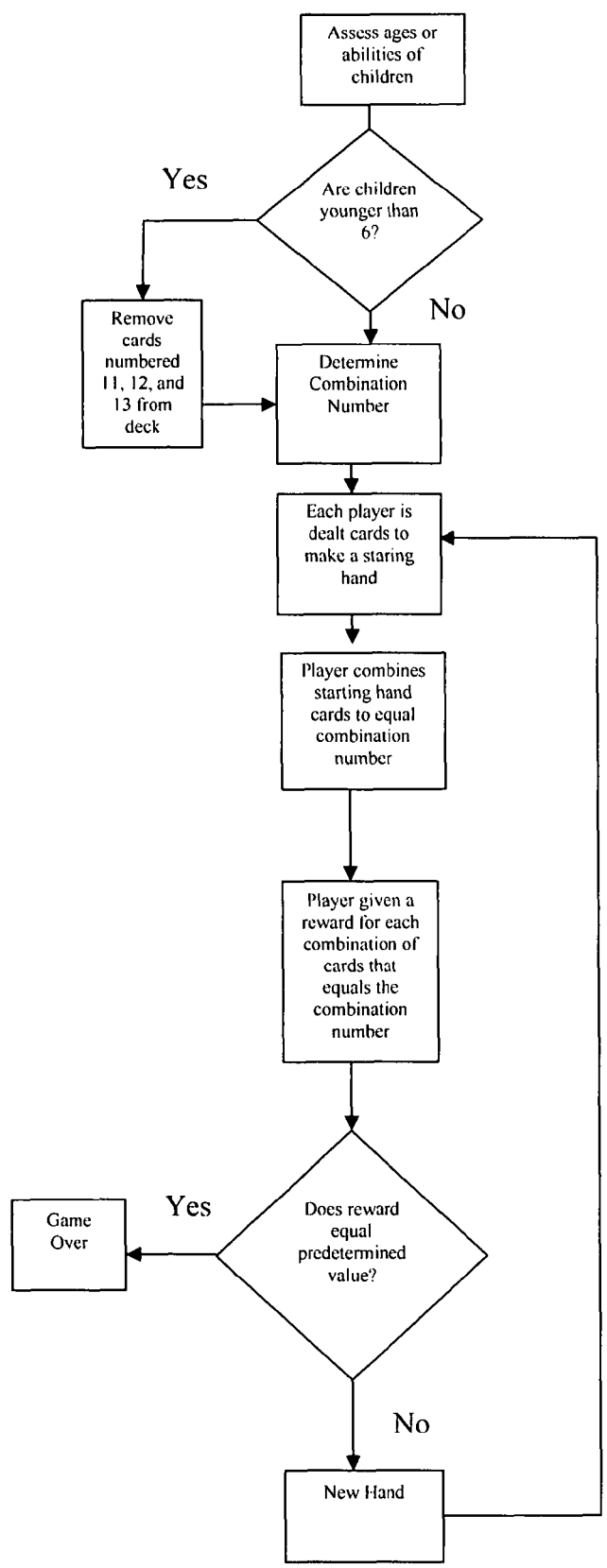
FIG. 1 shows a flow chart of the game of the present invention.

While the invention is susceptible to various modifications and alternate forms, a specific embodiment thereof has been shown by way of example and the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the appended claims.

The game of the present invention can be played one of three different ways depending on the ages and the skills of the players. In the first two levels, the game is most typically played with two players. One of the players is often a teacher or an instructor. Third level of the game is often played with more than two players. Any of the levels however, can be played with any number of players. If more players are added, then it would be appropriate to increase the size of the deck as described below.

Level 1 of the game will typically be played by players, ages three to seven, Level 2 of the game will typically be played by children, ages six to eight, and Level 3 of the game will be played by ages seven and above. It should be noted that the recommended ages for each level of the game are simply recommendations, and different children of different ages, may play different levels of the game depending upon their particular ability. For example, older children with learning disabilities may play lower levels of the game than normally specified for their age range, while advanced children may play at higher levels of the game.

At all three levels of the game, the object of the game is to combine cards from the deck to achieve a combination number. In a preferred embodiment, the object is to use the face values of the cards dealt in a turn to make as many exact combinations of 10 or multiples of 10 as possible. The combination number can be any number determined by the instructor or selected by the players. At Level 1, the combination number is preferably 10. At Levels 2 or 3 the combination number is preferably any multiple of 10. Therefore, players playing the game at Level 2 or 3 would seek to combine the cards so that the combination equals 10, 20, 30, 40, 50 or 60. Any combination of cards equaling one of these values (a multiple of ten) would be appropriate and would earn the player points.

At the beginning of the game, each player is dealt at least 3 cards which constitute his hand. However, during a player's turn, he may use both his hand and the cards of the other player as well. After the player has made as many combinations as he can with the six cards, any cards that have been used from his hand only are replaced and he continues to make combinations. Only the player's cards continue to be replaced but he may use any of his opponent's cards that remain on the table. The player's turn is over when he has 3 cards in his hand and he can no longer make any combinations. At that point, any cards from the opponent's hand that have been used are replaced and the opponent begins his turn. In other embodiments the player may be dealt any number of cards. For play at Level 1, the cards numbered 11, 12, and 13 are removed from the deck. The player takes her turn and makes as many matches as possible using the cards. The cards making the match are put in a discard pile, and new cards are dealt to the next player from the deck in a number equal to the number of cards used to make the match. For Level 3, at least three cards are dealt to each player, and the player taking a turn can make matches using his cards or another player's cards. The difference in Level 3 is that more than 2 players play and the number of hands available to the active player are determined at the beginning of play by the players.

It should be noted that while making combinations equal to 10 or multiples of 10 are preferred, the combination number is by no means limited to these selections, and can be any number chosen by the instructor or the players. For example, for Level 1, any individual number between 5 and 20 could be chosen as a combination number. For Levels 2 and 3 other multiples can be chosen, for example, multiples of 3, 5 or 7 are possibilities. The game could be used to teach bases other than ten. An example is binary, which is base two and is used by computers. There are other bases which are commonly used in science. To illustrate alternate bases, the number 63 in our base ten system would be expressed as 223 in base five. The first place on the right is the ones place as it is in our everyday, base ten system; the middle place is groups of 5; the left most place is groups of 25. The highest numeral allowed in any place is 4 just as the highest numeral allowed in any place in our base ten system is 9. This same number, 63 expressed in base two would be 111111. Explanation: starting at the right, the first place is 1, then in groups the next is 2 or 2×1, then 4 or 2×2, then 8 or 2×4, then 16 or 2×8, then 32 or 2×16, then 64 or 2×32, etc. The cards would have to be altered for each different base but the manner of play would remain the same.

The most preferred method of combining the cards to achieve the combination number is addition, although subtraction and multiplication may also be used. The instructor or players can select a single method of combining the cards for the entire game, or the method of combining the cards may be changed on a consistent or random basis. Therefore, if the players are changing the method of combination, each player could take turns for each hand by a different method or, a player or the instructor could randomly call out the method to be used for a different hand.

Figure 2:
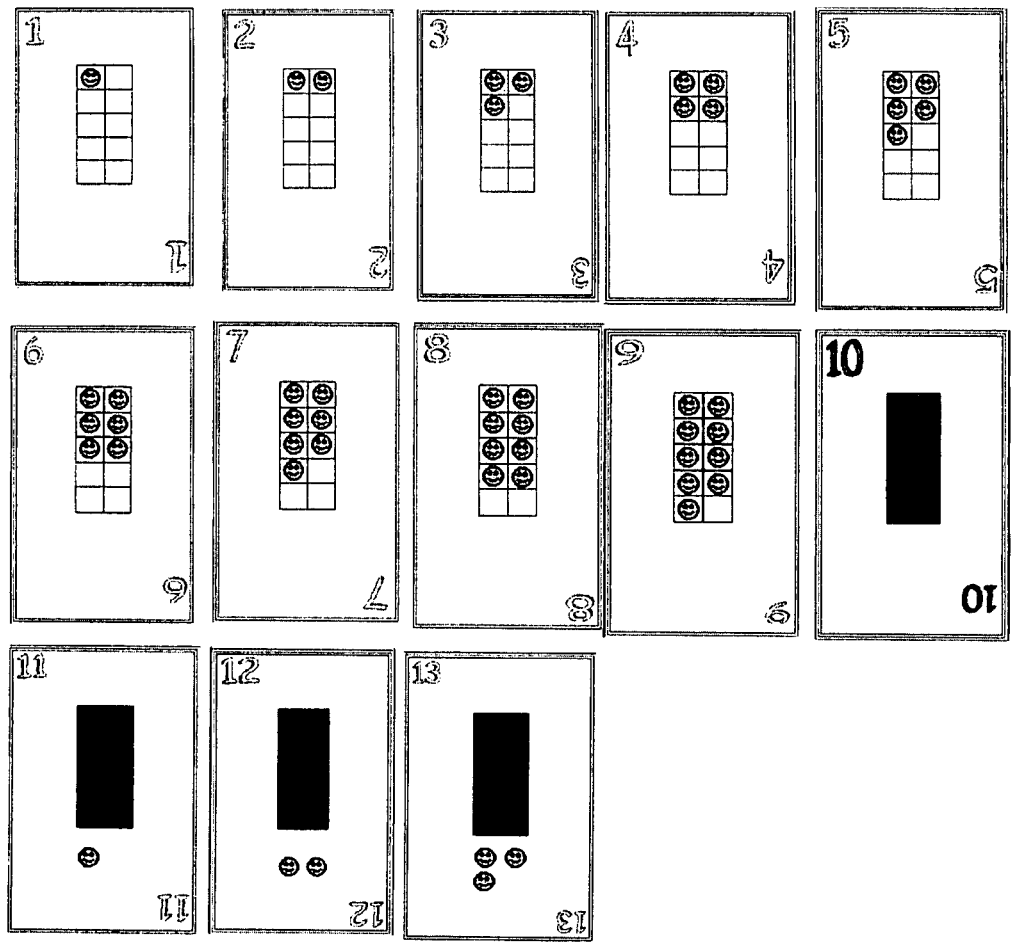
FIG. 2 shows the card deck of a preferred embodiment of the invention, illustrating cards one to thirteen, and the individual counting grids disposed thereon.

The cards used to play the game are illustrated in FIG. 2. A typical "group" of cards is a sequentially numbered deck, numbered from 1 to 13. However, in different embodiments of the invention, decks with more or less cards could also be used. A game with two players is preferably played with at least two groups of cards, and most preferably played with four groups of cards. During play at Level 1, the 11, 12, and 13 cards are removed from each group. Other cards may be removed or added from each group of the deck in other embodiments. Five, six or more groups of cards may be used.

In a highly preferred embodiment, each card has pictures graphically representing the number needed to achieve the combination number. This is illustrated in FIG. 2.

Preferably, each card has a graphical depiction of the number that the card represents. So, for example, as seen in FIG. 2, the card representing the number "1" has not only the number "1" but also a counting figure in this case represented by a happy face. The card representing the number "2" has both the number "2", and two counting figures (two happy faces). This pattern repeats itself up until the number "10" is reached. The number "10" is represented by a solid bar. Importantly, the counting figures appear on a grid, which has 10 spaces. Therefore, if the combination number is 10 or a multiple of 10, then the player can look at the graphical representations and imagine the number of additional counting figures needed to fill in the blank spot in the grid. This imagination process helps the player visualize the counting process and reinforces learning. The graphical representations can be printed on the card in any manner consistent with the principles articulated herein, and the grid can be printed on the card with any number of open spaces.

Aside from the deck of cards, the other item needed to play the game is a method of tracking the number of matches made by players. This can be any method of tallying points and can be as simple as tracking the score using a pencil and a pad of paper. For younger players, ordinary coins can be used to keep track of the number of combinations that the player makes during the game. For a two player game at any level, the means for counting can comprise a coin collection of 15 pennies, 8 nickels, 6 dimes, 6 quarters, and 1 dollar bill.

A point is awarded for each combination of cards or "match" the player makes equaling the combination number. In one preferred embodiment of the game, the player is allowed to use each card in a hand only once to make a match, and tries to make as many matches as possible that equal the combination value. If coins are used to track the number of matches the player makes, then pennies can be exchanged for nickels, nickels can be exchanged for dimes, etc. Coding in this manner helps younger children recognize coins and their values. In alternate embodiments, each card can be used as often as needed.

Some optional counters are Unifix Cubes® or Multilink Cubes®, which can be arranged in patterns of ten. Individual counters such as toothpicks, buttons, etc. should not be used because they encourage linear rather than conceptual thinking.

For advanced scoring, smaller value coins must be exchanged for larger coins. All possible exchanges of smaller value coins for larger value coins should be made during a player's turn. If a player fails to exchange his smaller value coins for larger ones during his turn, any subsequent player can claim those coins by making that exchange correctly during his own turn and keeping the larger coins. Thus, if two players are playing, one fails to exchange his 5 pennies for a nickel during his turn, then the other player during her turn can claim his 5 pennies by demonstrating the correct exchange, keeping his nickel.

The game can be ended when the first player reaches a mutually agreed upon limit, otherwise known as the predetermined game end value. For young children, the game might be ended when the first player accumulates a dime. Children love to accumulate winnings from several game sessions in a small container or even a plastic bag until they have four quarters to exchange for a dollar bill. When playing at the most advanced level, it is easy to reach a hundred points and so a dollar or "100" is a convenient predetermined game end value. When playing the game for instructional purposes, allowing children to keep their "winnings" adds great incentive.

At all levels of play, adults should think out loud and describe how they are visualizing the movement of happy faces (counting figures) to reach the combination value. This models the thinking patterns that are to be developed in the child. It is important that when mistakes in calculations are made children NOT be told that they are wrong. Instead both players should frequently double check themselves using manipulative objects whether or not their answer is correct. In this way, the adult simultaneously avoids signaling an incorrect response and models the desired "thinking". Unifix® or Multilink® cubes grouped in sticks of ten are helpful.

Cards should be shuffled face down at the beginning of play and should be dealt from the top of this active pile. As cards are used for matches, they are placed face up in a discard pile. When the active card pile gets low, the discard pile is turned over, shuffled and put back into play.

EXAMPLES

Example 1

Level 1 can be played by children ages 3 to 7 who have the ability to count 10 objects. This example is illustrated in FIG. 1. This level should always be played with an adult or with an adult closely coaching.
1. Remove the following cards from the deck: 11, 12, and 13.
2. Mix all the remaining cards thoroughly.
3. Three cards are dealt to each player. If only one child is playing, 3 cards are dealt to the child and three are dealt to the instructor.
4. The player combines the values of the cards to make as many combinations (matches) of 10 as possible.

For example, if a 2, 5, 3, to the child and a 8, 2, and 6 are dealt to the instructor, the following "matches" would be possible: 2+5+3=10 and 8+2=10 and the 6 would be left unmatched. The total score for this play would be 2 points and if coins are being used, the player would take 2 pennies. Optionally, the player could make one combination using 2+2+6=10 and the 5, 3, and 8 would be left unmatched. This play would result in 1 point. The instructor should encourage older or more experienced players to find all possible options before a final choice is made. However, the adult should accept whatever that choice is.

5. The turn is over when all possible matches and coin exchanges have been made. The player then says "My turn is over."
6. Any unplayed cards are left on the table and enough new cards are dealt so that the next player has 6 cards to use in making his matches.
7. Play continues, alternating turns, until one player reaches the predetermined game end value.

To add further instructional value to the game, when the child misses his chance to exchange coins, it is important for the adult to make the exchange and keep the child's coins. Thus, if two players are playing, one fails to exchange his 5 pennies for a nickel during his turn, then the other player during her turn can claim his 5 pennies by demonstrating the correct exchange, keeping his nickel. This is very instructive and causes the child to be thoughtful during his turn and more observant throughout the game. The child will be alert to any mistakes the adult makes. This alertness should be rewarded by the adult deliberately making mistakes. It is much more instructive to catch the child and let the child catch you than it is to nag and give hints which prevent the child from making mistakes.

Example 2

Level 2 may be played by children ages 6 to 8 who have the ability to count up to 60 and to skip count by tens. Level 2 is illustrated in FIG. 1, where the answer to the first question in the decision box is "no". This level should always be played with an adult or with an adult coaching.
1. Play proceeds as in Level 1 except that all cards are used and the combination number will reach multiples of 10 (20, 30, etc.), multiples of 5 (10, 15, 20, etc.) or some other multiple. Players get 1 point for each multiple of 10. So, 10 is worth 1 point, 20 is worth 2 points, 30, three points, etc.
2. Children will need to be taught to use their imagination to manipulate the separate counting figures (happy faces) of the 11, 12, and 13 cards to make matches of 10 (or other multiple) and then add on the value of the red (10) rectangle to reach their total.

For example, if a 12, 5, 13 are dealt to the player and 8, 12, and 6 are dealt to the opponent, the following matches would be possible: 12+8=20 (worth 2 points) and 5+12+13=30 (worth 3 points) and the 6 would be left.

For illustrative purposes, a possible coaching dialogue would be "the 12 is the same as 10 (the red block) plus 2" and the 8 needs 2 to make 10 so you could use the 2 from the 12 to make that 10 then what would you have?" This would be the point at which manipulative objects could be used to demonstrate. Children should be encouraged to "see" in their imagination the counting figures moving from one card to the grid in another card to make these matches. The goal is to eventually eliminate the objects.

To continue the hypothetical dialogue, the instructor could say "now let's look at what's left. What do you need to go with the 5 to make 10?" Hopefully the child will respond, "5". If not, the instructor could ask the child to show 5 fingers and ask how many more are needed to make 10. The instructor would have the child review and repeat that there are 5 fingers on each hand and that together they have 10 fingers. The instructor could also ask how many of the cells in the grid are empty. This seems obvious, but conventional teaching is typically linear and it often obliterates the obvious.

The instructor then could ask if there are any cards that have left over counting figures that could be used to make the 5 that is needed. "What about the 2 from the 12 and the 3 from the 13? Could they be combined to make the needed 5"? If the child doesn't "see" this, the instructor could repeat the type of guidance described above using fingers and perhaps manipulative objects to arrive at the final total of 50. The instructor may comment "so now we have all the separate happy faces put together to make 10. What about these red blocks? Do you remember what they stand for? If we have 10 and we add the first red block (encourage counting by tens) we get . . . Now we add the second block and we get . . . "

3. The value of this turn would be 50 and the player could take a nickel either all at once or go through the procedure of taking 5 pennies and exchanging them for the nickel.
4. The child should frequently be encouraged to "help" the adult think through the adult's turn.

Example 3

Level 3 can be played by children or adults ages 7 and above. Even teenagers enjoy this level. This method of playing is illustrated in FIG. 1, where the answer to the question in the first decision box is "no". When playing for instructional purposes adult playing and coaching are advisable.
1. This level is played as previously described in Level 2, except there are more than two players. A player may use his own cards as well as any other player's cards to make his matches.
2. The player makes as many matches as possible using all the cards on the table.
3. As the player's cards are used he may replace those cards and continue matching until he has 3 cards in front of him (his hand is full) and he is unable to make any more matches.
4. The turn is over when the player's hand is full and he cannot make any more matches.
5. The next player replenishes any missing cards in his hand and proceeds as described above.
6. Since so many cards are used, it will be necessary to frequently shuffle and recalculate the discard pile.
7. At this level of play, it is to the player's advantage to use his own cards first since only his cards will be replaced. When faced with a choice of using his own or the opponent's cards to make the same match, the player should be guided to the realization that using his own cards is advantageous.

Although this invention has been described with a certain degree of particularity, it is to be understood that the present disclosure has been made only by way of illustration and that numerous changes in the details of construction and arrangement of parts may be resorted to without departing from the spirit and the scope of the invention.

I claim:

1. A method for playing a game, comprising:
providing a deck of cards having a predetermined combination number displayed on each card, the deck of cards comprising at least one set of cards sequentially numbered from one to thirteen, and each of the cards having a graphic representation of the value of the card and a graphic representation of the value of one or more other cards required to reach the combination number;
dealing to at least one player at least three cards from the deck to make a hand;
providing a reward to the player for each combination the player makes of the cards equaling the combination number; and
repeating said steps of dealing and providing a reward until the reward accumulates to a predetermined point.

2. The method of claim 1, wherein the cards forming the combination number are placed in a discard pile and sufficient cards are dealt from the deck to give the player a new hand.

3. The method of claim 1, wherein the player is limited to using each card in the hand only once to reach the combination number.

4. The method of claim 1, wherein the combination is made by adding the cards.

5. The method of claim 1, wherein the combination is made by multiplying the cards.

6. The method of claim 1, wherein the combination is made by subtracting the cards.

7. The method of claim 1, wherein the deck has the cards 11, 12 and 13 removed from each group.

8. The method of claim 1, wherein the game is played in the presence of an instructor.

9. The method of claim 1, wherein the reward is a point.

10. The method of claim 1, wherein the reward is a coin.

11. The method of claim 1, wherein the combination number is 10.

12. The method of claim 1, wherein the combination number is a multiple of 10.

13. The method of claim 1, wherein the combination number is 15 or a multiple of 5 greater than 15.

14. The method of claim 1, wherein the hand has 4 or 5 cards.

15. The method of claim 1, wherein the hand has 6 cards.

16. The method of claim 1, wherein the deck has four groups of cards sequentially numbered from 1 to 13.

17. The method of claim 1, wherein the deck is reshuffled after every play.

18. The method of claim 1, where there is more than one player, and each player can use cards from another player to reach the combination number.

\* \* \* \* \*